(12) United States Patent
Kauper

(10) Patent No.: US 8,834,080 B2
(45) Date of Patent: Sep. 16, 2014

(54) ROTARY TOOL, IN PARTICULAR A DRILL

(75) Inventor: Herbert Rudolf Kauper, Erlangen (DE)

(73) Assignee: Kennametal Inc., Latrobe, PA (US)

( * ) Notice: Subject to any disclaimer, the term of this patent is extended or adjusted under 35 U.S.C. 154(b) by 1153 days.

(21) Appl. No.: 12/679,380

(22) PCT Filed: Oct. 15, 2008

(86) PCT No.: PCT/EP2008/008719
§ 371 (c)(1),
(2), (4) Date: Jun. 24, 2010

(87) PCT Pub. No.: WO2009/049870
PCT Pub. Date: Apr. 23, 2009

(65) Prior Publication Data
US 2010/0260567 A1   Oct. 14, 2010

(30) Foreign Application Priority Data
Oct. 17, 2007   (DE) .................... 10 2007 050 050

(51) Int. Cl.
| B23B 51/02 | (2006.01) |
| B23C 5/10 | (2006.01) |
| B23D 77/00 | (2006.01) |

(52) U.S. Cl.
CPC ........... *B23B 51/02* (2013.01); *B23C 2210/325* (2013.01); *B23B 2251/44* (2013.01); *B23B 2251/282* (2013.01); *B23C 5/10* (2013.01); *B23B 2251/248* (2013.01); *B23B 2220/44* (2013.01); *B23D 77/00* (2013.01); *B23C 2210/54* (2013.01); *B23B 2220/24* (2013.01); *B23B 2251/14* (2013.01); *B23B 2220/605* (2013.01)

USPC .......................................... 408/224; 408/230

(58) Field of Classification Search
USPC ........................ 408/223–225, 227, 229–230
IPC ....................................................... B23B 51/02
See application file for complete search history.

(56) References Cited

U.S. PATENT DOCUMENTS

| 984,323 | A | * | 2/1911 | Vauclain | 408/228 |
| 1,514,704 | A | * | 11/1924 | Cornelius | 408/229 |
| 2,063,753 | A | * | 12/1936 | Pohlman | 408/229 |
| 2,332,295 | A | * | 10/1943 | Bouchal | 408/211 |
| 2,479,136 | A | * | 8/1949 | Schade | 408/223 |

(Continued)

FOREIGN PATENT DOCUMENTS

| DE | 20209767 U1 | 11/2003 |
| GB | 2433713 A | 7/2007 |

(Continued)

OTHER PUBLICATIONS

Patent Office of the Russian Federation, "Russian Office Action (and English Translation)", issued May 19, 2011, 5 pp.

*Primary Examiner* — Daniel Howell
(74) *Attorney, Agent, or Firm* — Larry R. Meenan, Esq.

(57) ABSTRACT

In order to provide a rotary tool, in particular a drill, with a long service life together with high-quality drill holes, particularly in the case of through bores, the invention provides a cutting head which extends along a rotational axis and has a plurality of main cutting edges which extend radially outwards and each end at a cutting corner having a corner bevel, wherein the corner bevels are of differing designs, specifically in the form of a roughing bevel and in the form of a finishing bevel.

13 Claims, 3 Drawing Sheets

(56) References Cited

U.S. PATENT DOCUMENTS

| | | | | |
|---|---|---|---|---|
| 2,858,718 | A | * | 11/1958 | Kohler .......................... 408/144 |
| 3,779,664 | A | * | 12/1973 | Caley et al. .................... 408/225 |
| 3,977,807 | A | * | 8/1976 | Siddall .......................... 408/223 |
| 4,116,580 | A | * | 9/1978 | Hall et al. ..................... 408/230 |
| 4,568,227 | A | * | 2/1986 | Hogg ............................. 408/224 |
| 5,078,554 | A | * | 1/1992 | Kubota .......................... 408/230 |
| 5,173,014 | A | * | 12/1992 | Agapiou et al. ................ 408/59 |
| 5,486,075 | A | * | 1/1996 | Nakamura et al. ............ 408/230 |
| 6,126,367 | A | * | 10/2000 | Reed ............................. 408/1 R |
| 6,132,149 | A | * | 10/2000 | Howarth et al. ............... 408/230 |
| 6,190,097 | B1 | * | 2/2001 | Thomas ......................... 408/230 |
| 6,224,302 | B1 | * | 5/2001 | Cole .............................. 408/224 |
| 6,253,812 | B1 | * | 7/2001 | Rinehart ........................ 142/56 |
| 6,443,674 | B1 | * | 9/2002 | Jaconi ........................... 408/1 R |
| 7,422,396 | B2 | * | 9/2008 | Takikawa ....................... 408/59 |
| 2002/0044844 | A1 | * | 4/2002 | Andronica ..................... 408/199 |
| 2003/0156912 | A1 | * | 8/2003 | Ono ............................... 408/229 |
| 2005/0135889 | A1 | * | 6/2005 | Turrini et al. .................. 408/230 |
| 2005/0169721 | A1 | * | 8/2005 | Schulte .......................... 408/227 |
| 2006/0029477 | A1 | * | 2/2006 | Anjanappa et al. ............ 408/230 |
| 2007/0009336 | A1 | * | 1/2007 | Lenander ....................... 408/230 |

FOREIGN PATENT DOCUMENTS

| | | | |
|---|---|---|---|
| JP | 61004611 A | | 1/1986 |
| JP | 63074512 U | | 5/1988 |
| JP | 63278708 A | | 11/1988 |
| JP | 05177420 A | | 7/1993 |
| JP | 07096411 B2 | | 10/1995 |
| JP | 08071824 A | | 3/1996 |
| JP | 09277109 A | | 10/1997 |
| JP | 11170106 A | | 6/1999 |
| JP | 2000263306 A | | 9/2000 |
| JP | 2002370113 A | | 12/2002 |
| JP | 2004338051 A | | 12/2004 |
| SU | 1057203 A1 | | 11/1983 |
| SU | 1060344 A | * | 12/1983 |
| SU | 1191197 A | * | 11/1985 |
| WO | WO 2004082874 A1 | * | 9/2004 |

* cited by examiner

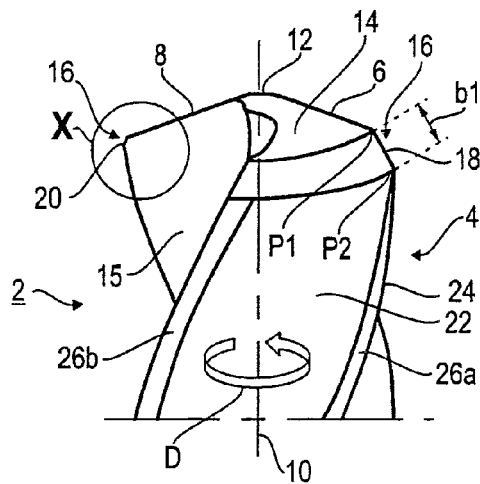
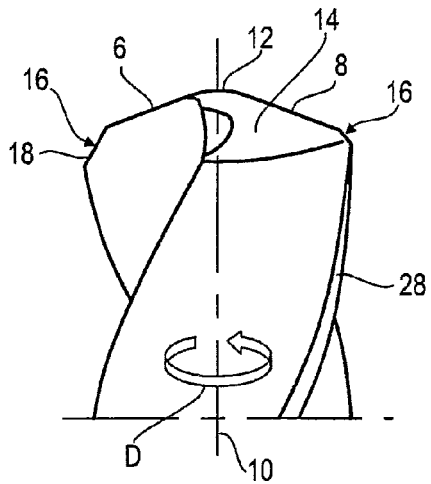
FIG. 1a  FIG. 1b
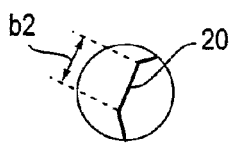
FIG. 1c
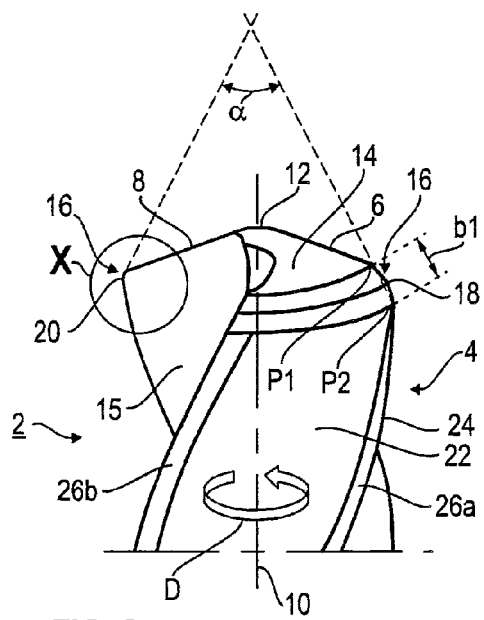
FIG. 2a  FIG. 2b

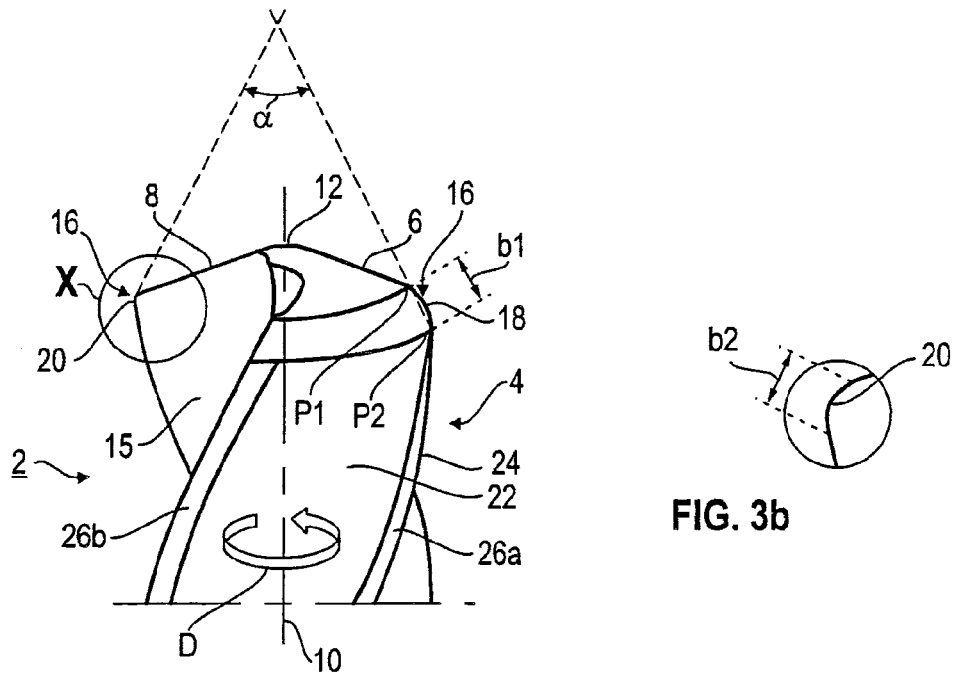
FIG. 3a
FIG. 3b
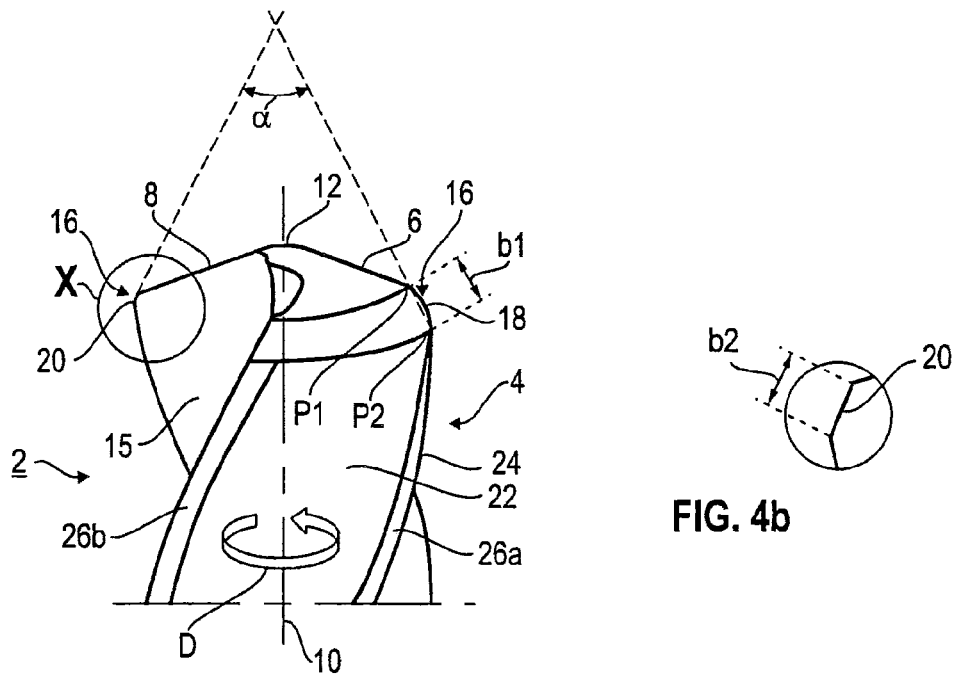
FIG. 4a
FIG. 4b

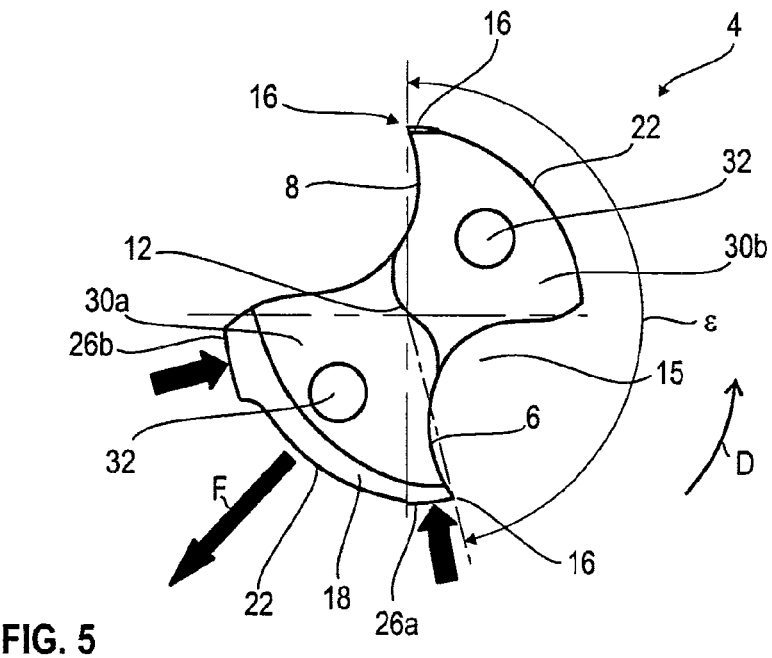
FIG. 5
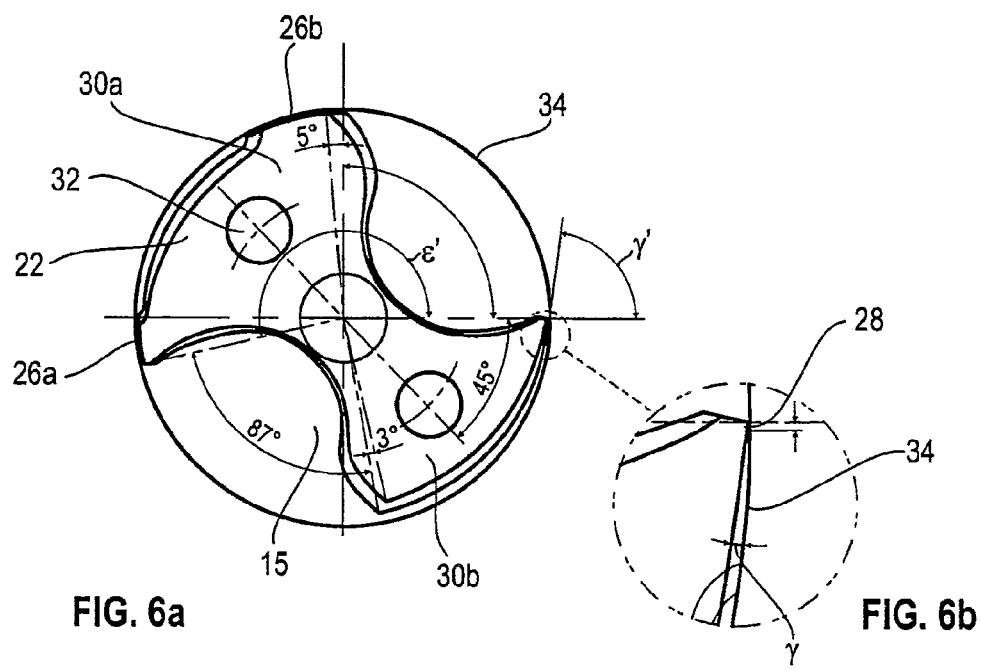
FIG. 6a
FIG. 6b

ROTARY TOOL, IN PARTICULAR A DRILL

BACKGROUND OF THE INVENTION

1) Field of the Invention

The invention relates to a rotary tool, in particular a drill, comprising a cutting head which extends along a rotation axis and has a plurality of main cutting edges which extend radially outward and each end at the circumference of the cutting head at a cutting corner having a corner bevel.

2) Description of the Related Art

Such a cutting tool designed as a rotary tool can be seen, for example, from DE 202 09 767 U1.

During the cutting operation, for example using drills, but also by means of reamers, milling cutters, in particular end mills, step drills, deep-hole drills or "three-lipped cutters", there is generally the problem that the cutting corner is subjected to both high mechanical and high thermal loading in these rotary tools. In order to reduce this loading, it is known to provide "corner bevels" at the cutting corner. Due to this corner bevel, the main cutting edge does not run out rectilinearly to the circumference. No cutting corner having a sharp point is therefore formed at the transition between the main cutting edge and the outer circumference. Due to this measure, the cutting corner is therefore subjected to less loading overall and therefore the service life of the cutting tool can be increased. At the same time, however, there is the problem that, when through-openings, for example through-bores, are being formed, an undesirable burr at the exit of the drill hole is increased. This often requires subsequent treatment of the burr in order to achieve the drilling quality required.

In order to counter "fraying of the drill hole", provision is made in the twist drill which can be seen from DE 202 09 7676 U1 for a re-working secondary cutting edge to adjoin a respective main cutting edge. A flank adjoining the main cutting edge therefore extends right up to the respective re-working secondary cutting edge assigned to the respective main cutting edge. In this case, the secondary cutting edge is arranged to be set back axially from the main cutting edge.

The object of the invention is to specify a rotary cutting tool which ensures a long service life and at the same time allows through-openings having as small a burr as possible to be formed.

SUMMARY OF THE INVENTION

The object is achieved according to the invention by a rotary tool having the features of claim 1. In this case, the rotary tool is in particular a drill. However, the features according to the invention can also be used in other rotary tools, such as, for example, reamers, milling cutters, in particular end mills, step drills, deep-hole drills, etc. Here, the rotary tool can be of both one-piece and modular design. In a modular tool, the cutting head is normally interchangeably fastened as a separate element in a parent body.

The rotary tool has a cutting head which extends along a rotation axis and which has a plurality of main cutting edges, in particular two main cutting edges, which extend radially outward. These main cutting edges each end at the circumference of the cutting head at a cutting corner which has a respective corner bevel. The corner bevels of the respective main cutting edges are designed to be different. They are designated as roughing bevel and as finishing bevel. The main cutting edge having the roughing bevel is also designated below as guide bevel and the main cutting edge having the finishing bevel is designated as free cutting edge. The two main cutting edges are characterized inter alia in that they are arranged at the same axial level as viewed in the axial direction. This means that main cutting edge sections, apart from in the region of the corner bevels, which are at the same radial distance from the center axis formed by the rotation axis, are arranged at the same axial level.

The decisive advantage of this configuration can be seen in the fact that the corner bevels are assigned different functions due to the different configuration thereof. Thus, the roughing bevel serves for initial or rough machining and the finishing bevel serves for re-work or finish machining. Due to this measure, a burr is largely avoided at through-holes on account of the finishing bevel. At the same time, the configuration of the roughing bevel ensures that the loading of the cutting corners is reduced and the service life is thereby increased overall.

The use of additional secondary cutting edges can be dispensed with and is therefore preferably dispensed with, thereby resulting overall in a rotary tool of simple geometry which is simple and inexpensive to produce. The different configuration of the bevels and the design thereof as roughing bevel and as finishing bevel is advantageous in particular in those rotary tools in which the cutting capacity is apportioned asymmetrically to the main cutting edges. In a rotary tool having two main cutting edges, the one main cutting edge therefore has a greater cutting capacity than the other main cutting edge. The one having the greater cutting capacity is designated as guide cutting edge and the one having the smaller cutting capacity is designated as free cutting edge. The guide cutting edge, which is subjected to higher loading, has the roughing bevel, and the free cutting edge, which is subjected to lower loading, has the finishing bevel.

Provision is therefore expediently made for the roughing bevel to be larger than the finishing bevel. The expression "larger" in this case means that, in order to form the bevel, more material is removed from the cutting head at the roughing bevel than at the finishing bevel. In particular, the expression "larger bevel" means that the width of the bevel is larger. The width of the bevel is in this case defined by the distance between the transition points to the main cutting edge on the one hand and to the secondary cutting edge, running along a flute, or the drill circumference on the other hand.

In order to eliminate the burr as far as possible and secondly achieve as long a service life as possible, the two bevels differ markedly in their size, such that the roughing bevel is expediently more than twice as large as, in particular five times as large as, the finishing bevel. In particular, the finishing bevel and the roughing bevel have a size ratio which is between 1:2 and 1:50 and is preferably between 1:25 and 1:50. Depending on the application, in particular depending on the nature of the material to be cut and/or the material of the rotary tool, the bevels can be designed as conventional sloping bevels, as round bevels or as double bevels. Bevels of identical design are preferably used here for the finishing and roughing bevels. Alternatively, it is also possible to design the finishing and roughing bevels to be different from one another, for example to configure the roughing bevel as a round bevel and the finishing bevel as a sloping bevel.

Furthermore, provision is expediently made for the two bevels to be inclined at the same inclination angle relative to the rotation axis. They expediently enclose between them a bevel point angle which is generally between 0° and a point angle defined by the main cutting edges. The point angle defined by the main cutting edges is designated as drill point angle in the case of a drill. The bevel point angle in this case is preferably within the range of between 40° and 100°.

The different configuration of the bevels is preferably used in an asymmetrically designed rotary tool in which the main cutting edges have different cutting capacities. This is achieved by the asymmetrical configuration overall.

In this case, provision is preferably made for the two main cutting edges, in a configuration having two main cutting edges, to be arranged at a pitch angle to one another which is different from 180°. The pitch angle in this case is preferably within the range of between 185° and 200°. It is expediently determined by a prime number, in particular 193°. It is generally the case that the pitch angle is not equal to the nth part of 360°, n being the number of main cutting edges.

Furthermore, in order to ensure sufficient concentric running in such an asymmetrical configuration, a supporting bevel is expediently provided on the outer circumference of the tool following the guide cutting edge in the rotation direction. In addition, a first supporting bevel is provided on the outer circumference, to be precise starting at the guide cutting edge. On account of the asymmetrical configuration and the higher cutting capacity of the guide cutting edge, the cutting tool is pressed on one side against the bore wall, such that improved concentric running is achieved by the double support. In contrast, no guide bevel or at most a small guide bevel, which likewise runs along the outer circumference in the axial direction, is provided at the free cutting edge. In this case, the supporting bevel and the guide bevels preferably run in each case along flutes. The different design of the corner bevels is used in particular in a rotary or drilling tool as described in DE 10 2006 025 294.2, to which reference is hereby made in this respect.

BRIEF DESCRIPTION OF THE DRAWINGS

Exemplary embodiments of the invention are explained in more detail below with reference to the figures. In the drawing, in each case in schematic and partly simplified illustrations:

FIG. 1a shows a side view of a rotary tool, designed as a twist drill, in the region of the drill point, FIG. 1b shows a side view of the drill point according to FIG. 1a after a 180° rotation about its rotation axis, FIG. 1c shows an enlarged illustration of the region of FIG. 1a identified by "X", FIGS. 2a, 2b show a side view of a drill point in a second configuration in which the bevels are designed as double bevels, FIG. 2b showing the region of FIG. 2a identified by "X", in an enlarged illustration, FIGS. 3a, 3b show an illustration, comparable with FIGS. 2a, 2b, of a third embodiment variant in which a corner radius is provided in each case for forming the bevels, FIGS. 4a, 4b show an illustration, comparable with FIGS. 2a, 2b, of a fourth embodiment variant in which the two bevels are of different design, FIG. 5 shows an end view of an asymmetrically configured drill point, and FIGS. 6a, 6b show a cross-sectional illustration of a drill having the drill point shown in FIG. 5, FIG. 6b being an enlarged illustration of the region in FIG. 6a identified by a circle.

Parts having the same effect are provided with the same reference numerals in the figures.

DETAILED DESCRIPTION OF THE INVENTION

The individual details and features are explained below with reference to a rotary tool designed as a twist drill 2. The twist drill 2, only shown in sections, has, as a cutting head, a drill point 4, on which a plurality of main cutting edges 6, 8, two in the exemplary embodiment, are formed at the end face.

Hereinafter, one main cutting edge is designated as guide cutting edge 6 and the other main cutting edge is designated as free cutting edge 8. The two main cutting edges 6, 8 are connected to one another via a chisel edge 12 in the region of a center axis of the drill 2, which at the same time forms a rotation axis 10. During use, the drill 2 rotates about the rotation axis 10 in rotation direction D. The drill point 4 is designed approximately in the shape of a lateral surface of a cone, such that the main cutting edges 6, 8 run obliquely outward from the chisel edge 12. A respective main flank 14 adjoins a respective main cutting edge 6, 8—as viewed in the opposite direction to the rotation direction D. A respective flute 15 is made in the drill body in front of the main cutting edges 6, 8 in the rotation direction D. Said flute 15 runs helically in the exemplary embodiment. The respective main cutting edge 6, 8 extends roughly in approximately the radial direction up to a cutting corner 16, a respective corner bevel being formed on the cutting corner 16. In this case, the guide cutting edge 6 has a corner bevel designated below as roughing bevel 18 and the free cutting edge 8 has a corner bevel designated as finishing bevel 20.

As can be seen directly from FIGS. 1 to 4, the two bevels 18, 20 are designed to be greatly different in size. In this case, the roughing bevel 18 has a width b1 and the finishing bevel 20 has a width b2, which is many times smaller than the width b1. The width in this case is defined by the distance between the transition or bend point P1 between the approximately rectilinear course of the respective main cutting edge 6, 8 to the respective bevel 18, 20 and the further transition or bend point P2 at which the respective bevel 18, 20 merges into the circumferential side, the "drill land" 22. In this case, the two bevels 18, 20 merge into a respective secondary cutting edge 24 running along the respective flute 15.

The ratio b2:b1 is preferably within the range of 1:2 to 1:50 and is in particular within the range of 1:25 to 1:50. The two lands 18, 20 are inclined by the same inclination angle relative to the rotation axis 10. If required, different inclination angles can also be provided. The two guide bevels 18, 20 together enclose a bevel point angle α, which in the exemplary embodiment is approximately within the range of between 60 and 90°, preferably within the region of 80°.

Whereas in the exemplary embodiment in FIG. 1 the two bevels 18, 20 are designed as simple sloping bevels, provision is made according to the exemplary embodiment in FIG. 2 for each bevel 18, 20 to be designed as a double bevel, that is to say for two sloping bevels to directly adjoin one another. Instead of the arrangement of two or even more sloping bevels disposed one after the other, the respective roughing bevel 18 or finishing bevel 20 can also be designed as a radius, as shown in FIG. 3. Finally, any desired combinations are possible, which can be selected in each case as a function of the respective requirements specification. It is thus possible, as shown in FIG. 4, to design the roughing bevel 18 as a round bevel and the finishing bevel 20 as a sloping bevel. Conversely, the finishing bevel can also be designed as a round bevel and the roughing bevel 18 as a sloping bevel or as a double bevel, etc.

The drill shown in FIGS. 1 to 4 is asymmetrical overall with respect to the rotation axis 10, as will be explained below in more detail with reference to FIGS. 5 and 6. As can already be seen when comparing the two side illustrations of FIGS. 1a and 1b, a first and a second supporting bevel 26a, 26b are provided at the margins on the drill land 22 adjoining the guide cutting edge 6, said supporting bevels 26a, 26b in each case running along the respective flute 15. In contrast thereto, the drill land 22 adjoining the free cutting edge 8 has only one guide bevel, designated below as residual guide bevel 28. It is also already indicated by the dashed illustration of the free cutting edge 8 in FIG. 1b that the two cutting edges 6, 8 are not arranged exactly opposite one another with respect to a 180° rotation.

It can be seen from the plan view according to FIG. 5 that the two main cutting edges 6, 8 are connected to one another via the chisel edge 12. The two main cutting edges 6, 8, measured at the cutting corners 16, enclose between them a pitch angle ϵ which is less than 180° and is in particular within the range of between 160° and 175°. In the exemplary embodiment, the pitch angle ϵ is preferably 167°. As can also be seen from the plan view of FIG. 5, the drill 2 is also constructed asymmetrically with regard to the material distribution relative to the axis of symmetry (rotation axis 10). To be precise, a first drill half 30a adjoining the guide cutting edge 6 is designed to be bulkier than the second drill half 30b adjoining the free cutting edge 8. In the plan view, the chisel edge 12 curved roughly in an S shape separates the two half sections of the drill 2 from one another. Starting from the cutting corner 16 having the roughing bevel 18, the first supporting bevel 26a adjoins the circumferential wall formed by the drill land 22. The second supporting bevel 26b is arranged at the end of the drill land 22 as viewed in the opposite direction to the rotation direction D. Said supporting bevel 26b has approximately half to twice the extent or width of the first supporting bevel 26a. The first supporting bevel 26a covers a rotation angle approximately within the range of 10° to 15°. The first drill half 30a adjoining the guide cutting edge 6 covers an angular range greater than 90°, in particular about 95° to 120°. In contrast thereto, the second drill half 30b covers an angular range which is smaller and in particular below 90° and is preferably greater than 70°.

As can also be seen from the plan view of FIG. 5, the roughing bevel 18, which can be clearly recognized, is designed to adjoin the guide cutting edge 6. In contrast thereto, the markedly smaller finishing bevel 20, which extends only over a small angular range of, for example, 10°, is formed on the cutting corner 16 of the free cutting edge 8. In contrast, the roughing bevel 18 extends continuously from the first supporting bevel 26a up to the second supporting bevel 26b.

Furthermore, two coolant passages 32 which emerge from the drill at the end face can be seen from FIG. 5 and FIG. 6.

A hole or bore wall 34 is additionally shown in FIG. 6. The two supporting bevels 26a, 26b are arranged on a circumferential line defined by the drill radius, such that they bear over the surface area against the bore wall 24 formed during the cutting operation. Good support overall is thereby achieved. At the same time, the residual guide bevel 28 is supported only at a small section on the bore wall 34, as can be seen in particular from the enlarged illustration of FIG. 6b. In this case, the support of the residual guide bevel 28 covers an angular range which is preferably less than 1°. Rather, a clearance angle γ is formed at the residual guide bevel 28 so that bearing against the bore wall 34 over a large surface area is prevented. In this case, the clearance angle γ is in the region of a few degrees, for example in the region of 10°. The pitch angle ϵ' complementary to the pitch angle ϵ is shown in FIG. 6. Further angular values which are selected for the exemplary embodiment can be seen from FIG. 6. These angular specifications can of course be different in alternative embodiment variants. Furthermore, the clearance angle γ' complementary to the clearance angle γ can be seen from FIG. 6a, said clearance angle γ' being 81° in the exemplary embodiment.

On account of the asymmetrical configuration of the drill, said drill has a deliberate asymmetrical force distribution. A resultant radial force F is therefore obtained during the rotation about the rotation axis 10, and this resultant radial force F leads to the drill 30 being supported with its drill half 30a against the bore wall 34. As a result, the supporting bevels 26a, 26b are loaded, as indicated by the arrows (cf. FIG. 5). At the same time, the opposite residual guide bevel 28 is relieved, such that asymmetrical loading of the drill overall occurs.

Substantially better concentric running and a better cylindrical form of the bore are achieved by the different configurations of the roughing bevel 18 and the finishing bevel 20 in conjunction with the specific support by the supporting bevels 26a, 26b.

The invention claimed is:

1. A rotary tool comprising a cutting head which extends along a rotation axis and has a plurality of main cutting edges which extend radially outward, each of the cutting edges end at the circumference of the cutting head at a cutting corner having a corner bevel,
   wherein one of the corner bevels is formed as a roughing bevel and another of the corner bevels is formed as a finishing bevel, and
   wherein the finishing bevel has a width and the roughing bevel has a width which is larger than the width of the finishing bevel
   wherein the finishing bevel and the roughing bevel enclose a bevel point angle between them which is between 40° and 100°.

2. The rotary tool as claimed in claim 1, wherein the width of the roughing bevel is more than twice as large as the width of the finishing bevel.

3. The rotary tool as claimed in claim 1, wherein the size ratio between the widths of the finishing bevel and the roughing bevel is between 1:25 and 1:50.

4. The rotary tool as claimed in claim 1, wherein the finishing bevel and the roughing bevel are inclined at the same inclination angle relative to the rotation axis.

5. The rotary tool as claimed in claim 1, wherein the cutting head is designed to be asymmetrical with respect to the rotation axis, and the main cutting edge having the roughing bevel is designed as guide cutting edge and the main cutting edge having the finishing bevel is designed as free cutting edge.

6. A rotary tool comprising a cutting head which extends along a rotation axis and has a plurality of main cutting edges which extend radially outward, each of the cutting edges end at the circumference of the cutting head at a cutting corner having a corner bevel,
   wherein one of the corner bevels is formed as a roughing bevel and another of the corner bevels is formed as a finishing bevel,
   wherein the finishing bevel has a width and the roughing bevel has a width which is larger than the width of the finishing bevel,
   wherein the cutting head is designed to be asymmetrical with respect to the rotation axis, and the main cutting edge having the roughing bevel is designed as guide cutting edge and the main cutting edge having the finishing bevel is designed as free cutting edge,
   wherein the guide cutting edge and the free cutting edge are arranged at a pitch angle different from 180°.

7. The rotary tool as claimed in claim 6, wherein a supporting bevel is provided on the outer circumference following the guide cutting edge in the rotation direction.

8. The rotary tool as claimed in claim 6, wherein the pitch angle is within the range of between 185° and 200°.

9. A rotary tool comprising a cutting head which extends along a rotation axis and has a plurality of main cutting edges which extend radially outward, each of the cutting edges end at the circumference of the cutting head at a cutting corner having a corner bevel, wherein one of the corner bevels is formed as a roughing bevel and another of the corner bevels is formed as a finishing bevel, and wherein the finishing bevel and the roughing bevel enclose a bevel point angle between them which is between 40° and 100°.

10. The rotary tool as claimed in claim 9 wherein the finishing bevel has a width and the roughing bevel has a width which is larger than the width of the finishing bevel.

11. The rotary tool as claimed in claim 9, wherein the width of the roughing bevel is more than twice as large as the width of the finishing bevel.

12. The rotary tool as claimed in claim 9, wherein the size ratio between the widths of the finishing bevel and the roughing bevel is between 1:25 and 1:50.

13. The rotary tool as claimed in claim 9, wherein the finishing bevel and the roughing bevel are inclined at the same inclination angle relative to the rotation axis.

\* \* \* \* \*

UNITED STATES PATENT AND TRADEMARK OFFICE
CERTIFICATE OF CORRECTION

| | | |
|---|---|---|
| PATENT NO. | : 8,834,080 B2 | Page 1 of 1 |
| APPLICATION NO. | : 12/679380 | |
| DATED | : September 16, 2014 | |
| INVENTOR(S) | : Kauper | |

It is certified that error appears in the above-identified patent and that said Letters Patent is hereby corrected as shown below:

IN THE SPECIFICATION

In Column 4, Line 20, delete "cuffing" and insert -- cutting --, therefor.

Signed and Sealed this
Seventh Day of April, 2015

Michelle K. Lee
*Director of the United States Patent and Trademark Office*